United States Patent [19]

Straw

[11] 4,026,746

[45] May 31, 1977

[54] METHOD OF MANUFACTURING AN OPEN-CELLED CERAMIC ARTICLE

[75] Inventor: Raymond L. Straw, Peoria, Ill.

[73] Assignee: Caterpillar Tractor Co., Peoria, Ill.

[22] Filed: Sept. 13, 1976

[21] Appl. No.: 722,978

[52] U.S. Cl. .................................. 156/155; 156/89; 156/242; 156/655; 264/60; 427/226; 428/72; 428/188

[51] Int. Cl.$^2$ ........................................ B32B 31/00

[58] Field of Search ............ 156/3, 7, 89, 155, 242, 156/296, 306, 630–633, 653, 655, 663; 165/166; 264/44, 58, 59, 60; 427/226, 243; 428/72, 73, 178, 188

[56] References Cited

UNITED STATES PATENTS

| | | | |
|---|---|---|---|
| 3,016,597 | 1/1962 | Denes | 156/89 X |
| 3,576,700 | 4/1971 | Dell | 156/155 X |
| 3,940,301 | 2/1976 | Straw et al. | 156/155 |

*Primary Examiner*—William A. Powell
*Attorney, Agent, or Firm*—Wegner, Stellman, McCord, Wiles & Wood

[57] ABSTRACT

A method of manufacturing an open-celled ceramic article having high wall strength, the article comprising a plurality of spaced walls of bondable material defining a plurality of elongate passage therethrough which are filled with a disintegratable filler material during the forming process, the surfaces of the filler material being coated with a partially disintegratable material comprising particles of boron nitride or other substance which is chemically inert with respect to the filler material and with respect to the walls. The coated filler material has sufficient form and strength to initially maintain the walls in their predetermined precisely spaced relation. After the walls are bonded into an integral unit, the filler material and the protective coating are independently removed from the article to re-establish the passages between the walls.

9 Claims, 3 Drawing Figures

U.S. Patent   May 31, 1977   4,026,746
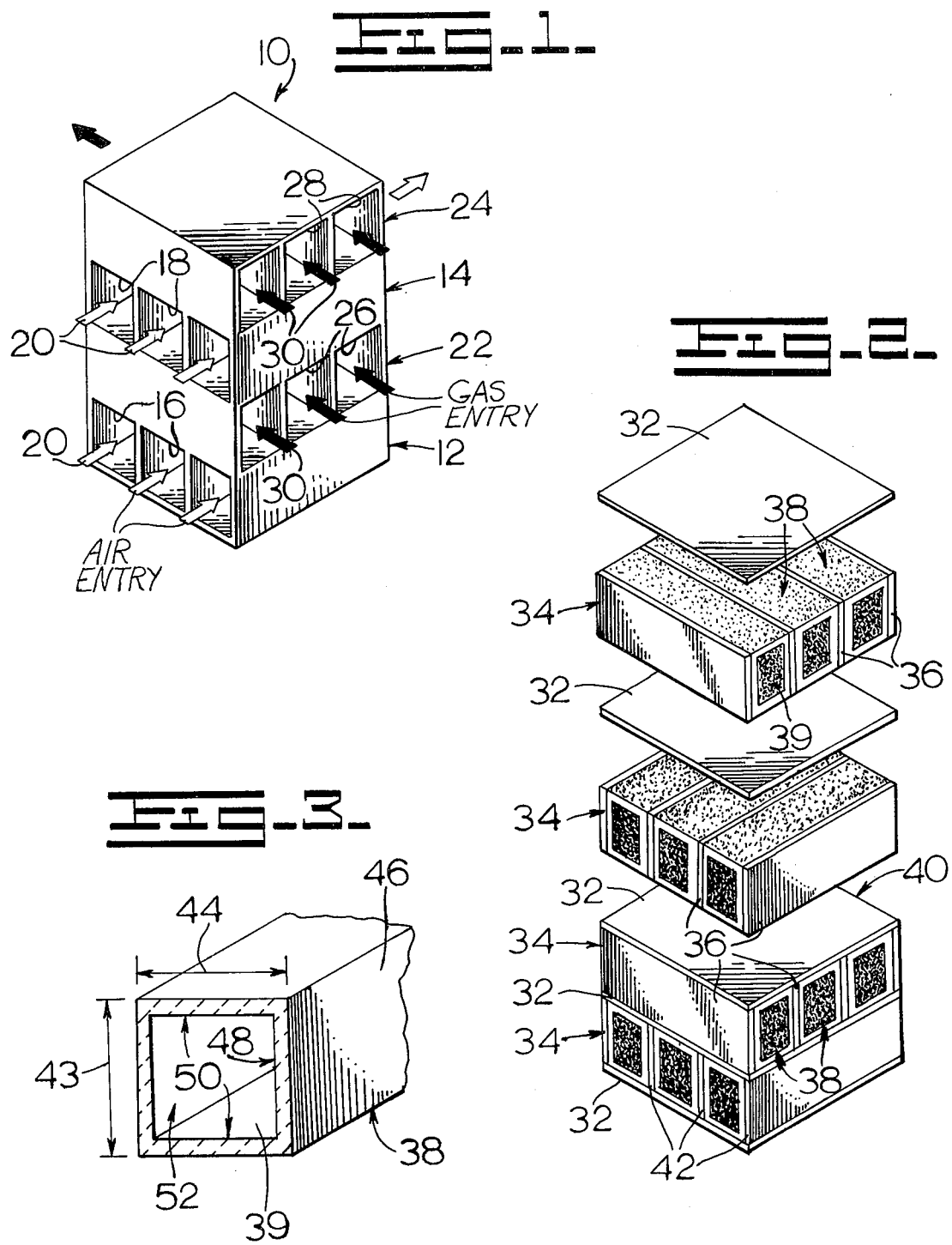

METHOD OF MANUFACTURING AN OPEN-CELLED CERAMIC ARTICLE

BACKGROUND OF THE INVENTION

1. Field of the Invention

This invention relates to methods of manufacturing open-celled ceramic articles and, more specifically, to methods of manufacturing high-strength silicon nitride heat exchangers for use in gas turbines and the like.

This invention is an improvement over U.S. Pat. No. 3,940,301, entitled "Method of Manufacturing an Open Cellular Article" issued to Straw et al and owned by the assignee of the present application, the details of which are herein incorporated by reference.

Straw discloses a method of manufacturing a ceramic article with accurately shaped openings, such as a cross-flow heat exchanger. According to Straw's method, a plurality of wall-forming members are formed from a ceramic-based mixture and are placed in edge contact with each other to form the desired shape of the final product.

Partially disintegratable supports are placed between the walls and the resulting structure is exposed to heat and pressure within a die. The structure undergoes an initial hot press wherein the temperature is raised to 1200° F. and pressure up to 500 psi is applied. This is followed by the final hot-pressing step wherein the temperature is raised to between 2500° F. and 2950° F., and pressure between 2000 and 2500 psi is applied and maintained for a period of up to approximately four hours.

The disintegratable portion of the supports and the walls is removed during the initial hot press step. Upon removal of the remainder of the supports following the final hot-press, a plurality of accurately shaped openings in the article is produced.

The walls of Straw's article are composed essentially of a mixture of an elastomeric binder, such as EPDM (ethylene propylene diene modified) rubber, and small particles of a suitable refractory material, preferably silicon nitride. The supports comprise a mixture of graphite powder filler and an elastomeric binder, such as EPDM rubber.

The use of passage-forming supports described above substantially eliminates the tendency of the walls to sag prior to the heating and hardening stages. This greatly facilitates the formation of intricate internal passages in the fired article. Further, the supports allow the preform to be extensively handled without damage.

One application of the type of heat exchanger produced according to the above method is the use thereof in gas turbines. Such turbines may operate at temperatures up to 2500° F. Operation at such temperatures may require heat exchangers which can withstand the stresses which accompany thermal cycling up to temperatures of 2160° F., as during start-up, for example. Heat exchangers operating at such temperatures require walls whose bend strength substantially exceeds 100,000 psi.

One disadvantage of the method of manufacture described above is the limited wall strength (or bend strength) of the finished product. The walls of heat exchangers made according to the above method exhibit bend strength in the range of 40,000 to 60,000 psi. This limited strength is due to chemical reactions occurring at approximately 2850° F. to 2900° F. between certain components of the wall supports and walls. The reactions, described below, remove silicon nitride from the walls, thereby weakening them.

Due to oxidation, all silicon nitride [$Si_3N_4$] particles in the walls are coated with silica [$SiO_2$]. At about 2600° F., the silica breaks down to form silicon monoxide and oxygen according to the following:

$$2 SiO_2 \xrightarrow{2600°\ F.} 2 SiO[g] + O_2 \quad (1)$$

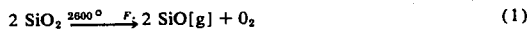

At about 2850° F., it is believed that the gaseous silicon monoxide reacts with the graphite present in the supports to form silicon carbide [SiC], carbon monoxide and carbon dioxide:

$$3 SiO + 5C \xrightarrow{2850°\ F.} 3 SiC + CO + CO_2 \quad (2)$$

The carbon monoxide and carbon dioxide then react with the silicon nitride particles present in the walls to form more silicon carbide, nitrogen and silica:

$$2 CO + 3 CO_2 + 3 Si_3N_4 \rightarrow 5 SiC + 6N_2 + 4 SiO_2 \quad (3)$$

The silica produced in equation (3) reacts according to equation (1) in continuation of the cycle.

The above reactions are detrimental in that the silicon nitride in the walls is replaced by silicon carbide, which imparts relatively low strength to the walls. It is possible to avoid this detrimental substitution by limiting the hot press temperature to values slightly less than 2850° F., at which point silicon carbide is formed according to equation (2). However, it has been determined that wall bend strength is positively related to hot press temperature, and hot press temperatures up to 2850° F. will yield bend strengths of only 40,000–60,000 psi.

It has been found that high temperature (i.e., above 3,000° F.) post-manufacture heat treatment of articles produced according to the Straw patent could result in increased wall strength. Such treatment may be effected with or without the application of pressure, but substantially all traces of the graphite filler material must be removed prior to the treatment so as to avoid the detrimental reactions described above. It may be understood that such heat treatment is a time-consuming and expensive step.

SUMMARY OF THE INVENTION

It is an object of the invention to provide a method of manufacturing open-celled ceramic articles, such as heat exchangers, wherein the walls of the article produced thereby exhibit greater bend strength than was previously possible.

More specifically, it is an object of the invention to provide a method of manufacturing open-celled ceramic articles, the walls of which consist essentially of silicon nitride and exhibit a bend strength in excess of 100,000 psi.

In a highly preferred embodiment of the invention, manufacture of silicon nitride heat exchangers is effected by assembling walls comprising a mixture of silicon nitride powders and an elastimeric binder into the desired shape and positioning boron-nitride coated supports in the passages between the walls. The resulting structure is subjected to heat and pressure, causing the interior of the supports to disintegrate for easy removal and further causing the silicon nitride walls to fuse and densify. The remainder of the coated supports is later removed. The boron-nitride coating isolates the interior of the supports from the walls, thereby preventing a reaction between the components present in the supports and the walls which would result in decreased wall strength in the finished product.

Other objects and advantages will become apparent from the following specification taken in connection with the accompanying drawings.

DESCRIPTION OF THE DRAWINGS

FIG. 1 is a perspective view of an integrally formed ceramic cross-flow heat exchanger made according to the present invention;

FIG. 2 is a partially exploded view of a plurality of wall-forming members and passage-forming support members prior to completion of their assembly during the manufacture of a heat exchanger similar to the one illustrated in FIG. 1; and, FIG. 3 is a perspective view of a portion of a coated passage-forming wall support member made according to the present invention.

DESCRIPTION OF THE PREFERRED EMBODIMENT

The present invention contemplates a modification of the Straw method by the additional step of coating the wall supports with a substance which is inert with respect to the components of the supports and the walls, thereby insulating the supports from the walls so as to avoid the detrimental reactions discussed above.

FIG. 1 shows, in enlarged and schematically simplified form, a ceramic heat exchanger 10 made according to the present invention. The heat exchanger 10 is illustrated as having four layers. The first and third layers 12 and 14 are substantially similar and each includes a plurality of elongate passages 16 and 18 therein for the entry and exit of relatively cool air, as illustrated by the open arrows 20. The second and fourth layers 22 and 24 include elongate passages for the flow of hot gas, as shown by the closed arrows 30. The substantially right angle relationship between these air flow and gas flow passages thus defines a cross-flow type of heat exchanger wherein the relatively hot gas flow 30 transmits heat to the relatively cool air flow 20 prior to the delivery of the heated air to an associated engine or the like, not shown, in order to improve the efficiency thereof in the usual manner.

In accordance with the present invention, the ceramic heat exchanger 10 of FIG. 1 is preferably manufactured by alternately stacking five wall-forming separator sheets or wall members 32 with four sandwich sections 34 as shown in FIG. 2. Such sections individually include four wall-forming partitioning ribs or wall members 36 and three passage-forming or wall support members 38. As discussed above, the wall members 32 and 36 consist essentially of a mixture of small ceramic particles and binding ingredients. The particles may be selected from the group consisting of refractory nitrides, refractory carbides and refractory oxides, but preferably consist of silicon nitride. The binding ingredient preferably comprises EPDM rubber, but may be chosen from the group including natural rubber, polyvinyl butyral, or a mixture thereof. The interiors 39 of the wall supports preferably comprise a mixture of graphite filler and EPDM rubber or other binder. The wall members 32 and 36 and the passage-forming supports 38 are assembled into a closely associated, relatively solid structure partially represented by a preform 40 shown at the lower portion of FIG. 2 and forming approximately half of the full structure necessary to produce the heat exchanger 10 of FIG. 1.

In this manner, a plurality of joints 42 are provided by the relatively limited contact between the sheets 32 and the edges of the ribs 36. Thus, the relatively weak wall members 32 and 36 are held in a predetermined fixed spatial relationship to each other by the supports 38 to provide a substantially solid preform 40. The supports are subsequently removed and form no part of the monolithically formed and hardened ceramic heat exchanger 10.

An example of the wall supports 38 utilized by the method of the present invention is represented in FIG. 3. The outer dimensions of the wall support 38 correspond to the desired dimensions of passages 16, 18, 26 and 28. The interior 39 of the support 38 is composed essentially of a mixture of graphite powder filler and an elastomeric binding material, such as EPDM rubber, and is intended to be substantially identical in composition to the supports utilized in Straw's method. The dimensions 43 and 44 of the interior 39 are correspondingly smaller than the dimensions of Straw's supports in order to allow the outer dimensions of the coated support 38 to correspond to the dimensions of the passages 16, 18, 26 and 28.

The coating 46, composed essentially of a mixture of boron nitride particles and an elastomeric binding material, such as EPDM rubber, is applied to the surfaces 48 and 50 of the interior 39 so as to entirely cover these surfaces. The coating 46 need only be so thick as to completely cover the surfaces and to add sufficient width and height to the interior 39 as to correspond to the dimensions of the air flow and gas flow passages.

The function of the coating 46 is to isolate the graphite filler material of the interior 39 from the silicon nitride present in the walls 32 and 36, thereby precluding the detrimental reactions (2) and (3), discussed above. The ends 52 need not, but may, be coated, as they will be effectively sealed by the walls of the vessel (not shown) used to enclose the preform during the heat and pressure treatment.

The interior 39 may be coated in any suitable manner, as by dipping, extrusion or pressing, for example. Boron nitride is especially suitable for use as an element of the coating mixture due to its non-reactivity with respect to the graphite filler in the interior 39 and to the silicon nitride present in the walls 32 and 36. Boron nitride also withstands the high temperature experienced in the forming process.

The coated supports 38 are placed between the walls 32 and 36 for assembly into a preform 40, illustrated in FIG. 2. The heat and pressure treatment of the preform may take place at temperatures substantially above 2850° F., however, as the graphite present in the supports 38 is effectively insulated from the silicon nitride present in the walls 32 and 36, and therefore cannot react with gaseous silicon monoxide as described in equation (2) above. The result of the use of hot pressing temperatures substantially above 2850° F. is increased bend strength of the walls 32 and 36.

As the preform 40 undergoes the initial hot pressing step at temperatures up to 1200° F., as described by Straw, the binding ingredients in the interior 39, coating 46 and walls 32 and 36 decompose, with a portion of the decomposed material being allowed to escape the die. This initial step is followed by the high-temperature hot-pressing step described by Straw, but which may take place at temperatures of at least 2850° F. and generally in between 2850° F. and 3200° F., and at pressures of 1000 psi to 5000 psi.

After the hot-pressing step, the remainder of the interior 39 must be removed from the finished article in the conventional manner. The remainder of the coating 46 need not be removed from the surfaces of the passages 16, 18, 26 and 28, but the heat-transfer capabilities of the finished article may be impaired if removal is not effected. If removal of the residual boron nitride is desired, it may be effected by means of etching with molten sodium chloride.

It is known that wall bend strength is positively related to the hot-pressing temperature. Therefore, it is clear that the bend strengths exhibited by articles produced according to the foregoing will be higher than previously possible since the hot-press temperatures of previous methods were limited to a maximum of about 2825° F., the threshold temperature for the reactions set forth previously which decrease wall strengths. Heat exchangers made according to the present invention typically exhibit bend strengths in excess of 100,000 psi.

From the foregoing, it may be appreciated that silicon nitride heat exchangers manufactured according to the invention will exhibit wall strength sufficient to withstand the great stresses experienced in use in high temperature applications, such as in gas turbines, for example.

What is claimed is:

1. A method of manufacturing an open-celled ceramic article, said method comprising the steps of:
    forming a ceramic-based mixture into a plurality of sheets of wall-forming members, said mixture comprising an elastomeric binding material and silicon nitride powder;
    independently forming a disintegratable filler mixture into a plurality of wall support members, said mixture comprising an elastomeric binding material and graphite powder;
    applying a protective coating so as to cover the surfaces of said wall support members, said coating being chemically inert with respect to said wall-forming members and to said wall support members, and comprising a mixture of an elastomeric binding material and a material which is inert with respect to said filler mixture and to said ceramic based mixture under the temperature and pressure conditions of the method;
    assembling said wall-forming members and said coated wall support members in contiguous relation to provide a relatively solid structure with said wall-forming members being disposed in edgeward contact with each other to form a plurality of joints therebetween;
    heating said structure and permitting said support members and said coating to partially decompose while still bracing said wall-forming members and causing said wall-forming members to harden and said joints to fuse in a predetermined pattern; and,
    removing the remainder of said partially decomposed support members to provide a plurality of accurately-shaped openings in the ceramic article.

2. The method of claim 1 wherein said coating mixture comprises an elastomeric binding material and a ceramic powder.

3. The method of claim 2 wherein said ceramic powder is boron nitride.

4. The method of claim 1 including the additional step of removing the remainder of said partially decomposed coating.

5. The method of claim 4 wherein the step of removing the remainder is performed by etching with molten sodium chloride.

6. The method of claim 1 wherein said elastomeric binding material is chosen from the group consisting of ethylene propylene diene modified rubber, natural rubber, polyvinyl butyral, and a mixture of rubber and polyvinyl butyral.

7. The method of claim 1 including the step of subjecting said structure to pressure during said heating thereof.

8. The method of claim 7 wherein said structure is subjected to pressure in the range of 1000 psi–5000 psi.

9. The method of claim 1 wherein the step of heating includes the application of heat at a temperature at least about 2800° F.

* * * * *